P. GRAVERT.
ROLLING DRUM PLOW.
APPLICATION FILED MAR. 29, 1921.

1,407,407.

Patented Feb. 21, 1922.
2 SHEETS—SHEET 1.

Inventor
Peter Gravert

P. GRAVERT.
ROLLING DRUM PLOW.
APPLICATION FILED MAR. 29, 1921.

1,407,407.

Patented Feb. 21, 1922.
2 SHEETS—SHEET 2.

Inventor
Peter Gravert
By Philip A. H. Ferrill
his Attorney

UNITED STATES PATENT OFFICE.

PETER GRAVERT, OF OMAHA, NEBRASKA.

ROLLING-DRUM PLOW.

1,407,407.  Specification of Letters Patent.  Patented Feb. 21, 1922.

Application filed March 29, 1921. Serial No. 456,537.

*To all whom it may concern:*

Be it known that PETER GRAVERT, a citizen of the United States, residing at Omaha, in the county of Douglas and State of Nebraska, has invented certain new and useful Improvements in Rolling-Drum Plows, of which the following is a specification, reference being had therein to the accompanying drawing.

The invention relates to rolling drum plows of the type wherein soil engaging teeth are carried by the drum, which soil teeth dig into the ground and deliver soil to a pulverizer and has for its object to provide a device of this character wherein the drum is provided with soil teeth which are forced through apertures in the drum as said drum rotates, that is forced through the apertures adjacent the bottom of the drum and drawn into the drum adjacent the top thereof after they have performed their function.

A further object is to provide a rolling plow drum having circumferentially disposed apertures, through which apertures the digging arms of L-shaped soil stirring and digging elements extend. The L-shaped elements have one of their arms pivoted within the drum and are provided with lugs adjacent their bending points, which lugs engage a slot in an eccentrically mounted disc. Also to provide means whereby the eccentrically mounted disc may be positioned so that the digging teeth may be adjusted as to depth of dig and also adjusted so that the digging teeth will not extend through the drum as the drum is rolled over road surfaces, thereby preventing damage to the road.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
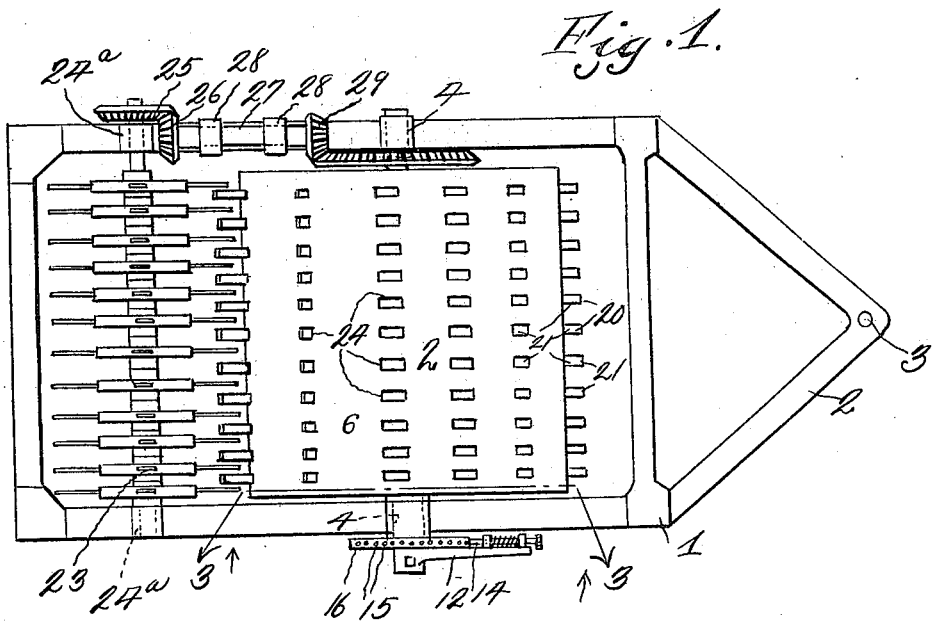
Figure 1 is a top plan view of the rolling drum plow.
Figure 2:
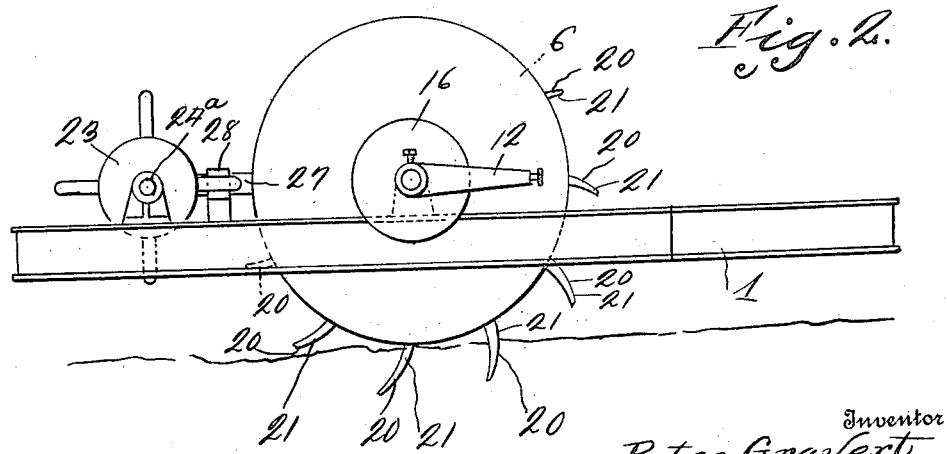
Figure 2 is a side view of the plow.

Referring to the drawings, the numeral 1 designates a rectangular shaped frame and 2 a V-shaped portion to the apex 3 to which a tractor or any other draft means may be secured. Rotatably mounted in bearings 4 of the frame are the sleeve hubs 5 of the drum 6. The drum 6 rotates in engagement with the ground as shown in Figure 2 and is out of periphery and is concentric with its pivotal point. Rotatably mounted in the sleeve bearings 5 of the drum 6 are the ends 7 of the shaft 8, the shaft 8 being offset from the end 7 thereof so that the cam discs 9 which are keyed thereon as at 10 are eccentrically mounted. Cam disks 9 are provided with camming slots 11 concentric to the shaft 8, but eccentric to its ends 7 so that when the ends 7, to one end of which is secured to the lever 12 is rotated to the cam discs 9 will be eccentrically positioned in relation to the inner periphery 13 of the drum, said discs 9 being held in any position to which it may be moved by means of the spring actuated detent 14, which detent engages any of the apertures 15 in the bearing carried circular rack 16.

Figure 3:
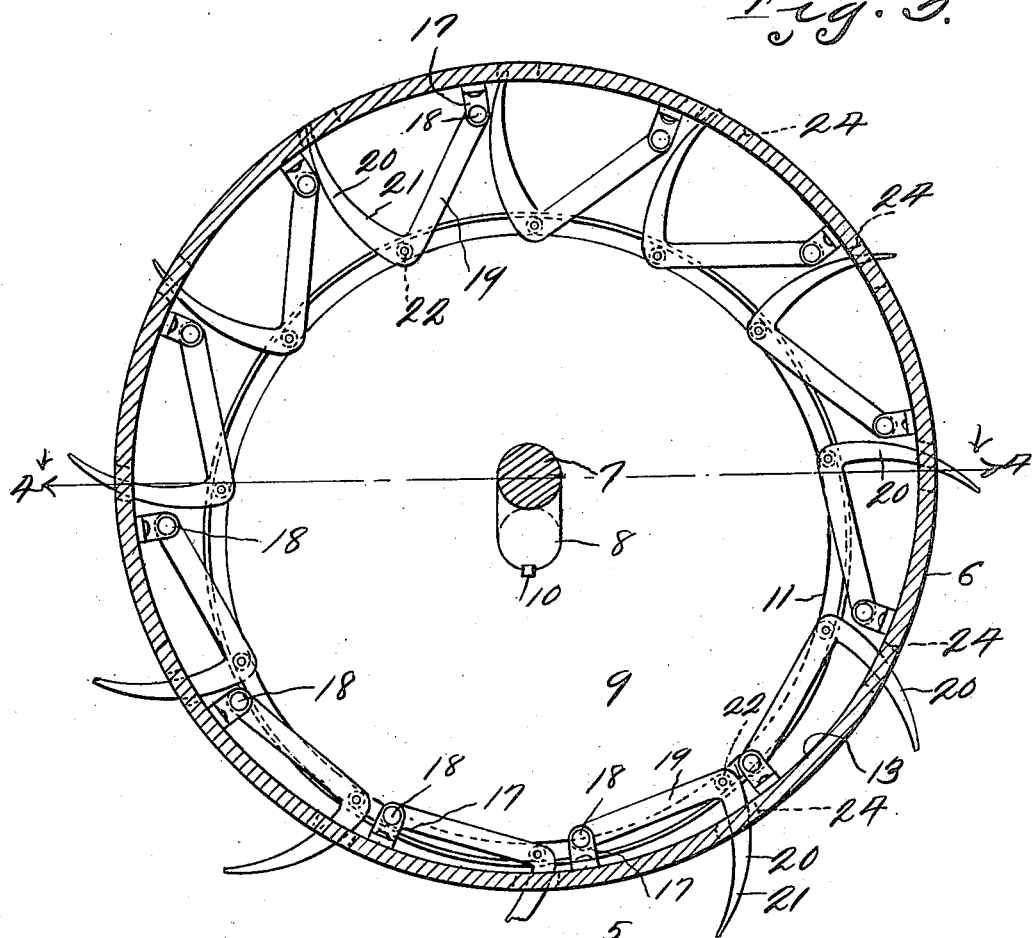
Figure 3 is an enlarged sectional view through the drum taken on line 3—3 of Figure 1.
Figure 4:
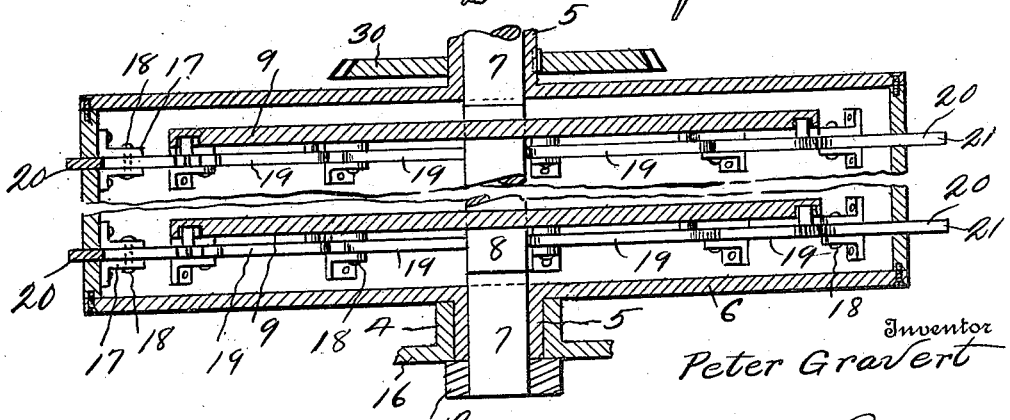
Figure 4 is a horizontal sectional view taken on line 4—4 of Figure 3.

Secured to the inner periphery of the drum 6 are equally spaced brackets 17, to which brackets are pivoted as at 18, the arms 19 of L-shaped digging teeth 20, said digging teeth having their digging arms 21 substantially concentric with the pivotal points 18 and the teeth 21 so disposed that when they are moved inwardly or outwardly on their pivotal point 18, said teeth will move in apertures 22 in the drum 6. Each L-shaped digging tooth 20 is provided with a lug 23, which lug is disposed in the camming slot 11 and forms means whereby as the drum 6 rotates in engagement with the ground the digging arms 21 will be moved into and out of the apertures 22, for instance when the camming discs 9 are in the position shown in Figure 3 the digging teeth arms 21 will start outwardly as they move downwardly at the forward side of the drum, will reach their maximum extension as they pass the vertical center line of the drum and will gradually be drawn into the drum as they move upwardly at the rear side of the drum and will be entirely drawn into the drum after they performed their function of delivering soil to the pulverizer 23, which is rotatably mounted in bearings 24ª for the rear end of the frame 1. Rotary movement is imparted to the pulverizer 23, in the opposite direction to the direction of rotation to the drum 6 by means of the meshing bevel gears 25 and 26, said gear 26 being carried by a shaft 27 rotatably mounted in bearings 28 of the frame 1. The forward end of the shaft 27 is provided with a bevel gear 29 which bevel gear meshes with a bevel gear 30 carried by the bearing sleeve 5 of the drum 6, thus it will be seen that as the drum 6 rotates as the plow moves forwardly over the ground the pulverizer 23 will also rotate.

From the above it will be seen that a rolling drum plow is provided wherein the power for operating the same is obtained from the rolling drum, in such a manner that the soil digging teeth will be forced outwardly adjacent the bottom of the drum as it rotates and it will also be seen that as the drum rotates that the pulverizer will also rotate through the medium of gear and shaft connections. It will also be seen that by positioning the cam discs 9, that the digging teeth may be positioned so that they will be forced outwardly through the apertures 22 of the drum at any desired side of the drum, thereby providing means for obtaining maximum digging and at the same time providing means whereby the outward movement of the teeth may be positioned so that they will not dig into and destroy roads as the plow is moved from place to place.

The invention having been set forth what is claimed as new and useful is:—

1. A rolling drum plow comprising a frame, a drum rotatably mounted in said frame, L-shaped ground engaging elements pivoted on the inner periphery of the drum and having digging arms extending through apertures in the drum, pins carried by said L-shaped digging members, said pins being disposed in an annular slot of eccentrically mounted camming discs disposed within the drum, and means whereby the eccentrically mounted camming discs may be rotated for positioning its annular slot so that the digging arms of the L-shaped digging elements will be forced through the apertures in the drum as the drum rotates at any side of the drum desired.

2. A rolling drum plow comprising a frame, a drum rotatably mounted in said frame, L-shaped engaging elements pivoted on the iner periphery of the drum and having their digging arms extending through apertures in the drum, pins carried by said L-shaped digging members, said pins being disposed in an annular slot of each camming disc, said camming discs being mounted and secured on an offset portion of a shaft having bearings concentric with the drum thereby eccentrically mounting the camming discs, the bearing portions of the shaft being mounted in sleeve bearings of the drum, and a lever secured to one end of the bearing portions of the offset shaft and forming means for positioning the camming disc for varying the outward movement of the digging arms and for drawing the digging arms within the drum.

3. A rolling drum plow comprising a frame, a drum rotatably mounted in said frame, L-shaped engaging elements pivoted on the inner periphery of the drum and having their digging arms extending through apertures in the drum, pins carried by said L-shaped digging members, said pins being disposed in annular slots of each camming disc, said camming discs being mounted and secured on offset portions of a shaft, said shaft having its ends concentric with the drum and forming bearings, thereby eccentrically mounting the camming disc, the bearing portions of the shaft being mounted in sleeve bearings of the drum, a pulverizer rotatably mounted to the rear of the drum and operated by said drum; and a lever having a spring actuated pawl secured to one end of the bearing portion of the offset shaft, said lever and spring actuated pawl cooperating with an annular rack and forming means for positioning the camming discs for varying the outward movement of the digging arms adjacent the bottom of the drum and for drawing the digging arms inwardly at the opposite side of the drum.

In testimony whereof I herunto affix my signature.

PETER GRAVERT.